(12) United States Patent
Mathew et al.

(10) Patent No.: US 8,854,757 B2
(45) Date of Patent: Oct. 7, 2014

(54) SYSTEMS AND METHODS FOR OLD DATA INTER-TRACK INTERFERENCE COMPENSATION

(71) Applicant: LSI Corporation, Milpitas, CA (US)

(72) Inventors: George Mathew, San Jose, CA (US);
Jongseung Park, Allentown, PA (US);
Erich F. Haratsch, Bethlehem, PA (US);
Bruce A. Wilson, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/705,116

(22) Filed: Dec. 4, 2012

(65) Prior Publication Data

US 2014/0153126 A1 Jun. 5, 2014

(51) Int. Cl.
*G11B 5/09* (2006.01)
*G11B 20/10* (2006.01)

(52) U.S. Cl.
CPC ............................ *G11B 20/10212* (2013.01)
USPC .................... 360/45; 360/31; 360/51

(58) Field of Classification Search
None
See application file for complete search history.

(56) References Cited

U.S. PATENT DOCUMENTS

| 8,250,434 | B2 | 8/2012 | Yang |
| 2012/0063022 | A1 | 3/2012 | Matthew et al. |
| 2012/0063023 | A1 | 3/2012 | Mathew |
| 2012/0063024 | A1 | 3/2012 | Mathew |
| 2012/0063284 | A1 | 3/2012 | Mathew |
| 2013/0021689 | A1 | 1/2013 | Haratsch |
| 2013/0070362 | A1 | 3/2013 | Mathew |
| 2013/0275829 | A1* | 10/2013 | Sridhara et al. ............ 714/755 |

FOREIGN PATENT DOCUMENTS

WO    WO 2012/058478    5/2012

OTHER PUBLICATIONS

Gibson et al "Directions for Shingled-Write and Two-Dimensional Magnetic Recording System" Architectures: Synergies with Solid-State Disks Carnegie Mellon Univ. May 1, 2009.
U.S. Appl. No. 13/618,317, Unpublished (filed Sep. 14, 2012) (Jun Xiao).
Wu, et al., "Equation Based LDPC Decoder for Intersymbol Interference Channels" 2005 IEEE International Conf. on Acoustics, Speech, and Signal Processing vol. 5 Mar. 2005.

* cited by examiner

*Primary Examiner* — Regina N Holder
(74) *Attorney, Agent, or Firm* — Hamilton DeSanctis & Cha

(57) ABSTRACT

Systems and methods for data processing, and more particularly to estimating or calculating interference between tracks on a storage medium.

19 Claims, 6 Drawing Sheets

SYSTEMS AND METHODS FOR OLD DATA INTER-TRACK INTERFERENCE COMPENSATION

FIELD OF THE INVENTION

Embodiments are related to systems and methods for data processing, and more particularly to estimating or calculating interference between tracks on a storage medium.

BACKGROUND

Data storage systems often store data arranged in tracks. FIG. 1a shows a storage medium 101 with two exemplary tracks 151,156 indicated as dashed lines. The tracks are segregated by servo data written within wedges 161, 166 (i.e., servo wedges). These wedges include data and supporting bit patterns 111 that are used for control and synchronization of the read/write head assembly over a desired location on storage medium 101. In particular, these wedges generally include a preamble pattern 192 followed by a sector address mark 194 (SAM). Sector address mark 194 is followed by a Gray code 196, and Gray code 196 is followed by burst information 198. It should be noted that while two tracks and two wedges are shown, hundreds of each would typically be included on a given storage medium. User data is stored at bit period locations between successive servo wedges. FIG. 1b shows an existing track to track layout 100 of data on a storage medium. Of note, track to track layout 100 includes only some of the data across some of the tracks that would be expected on an existing storage medium. As shown, layout 100 includes a number of tracks 105, 110, 115, 120, 125. Each of the tracks includes a synchronization pattern 150 (i.e., sync data 1, sync data 2, sync data 3, sync data 4, sync data 5) followed by bit periods of user data 155, 160, 165, 170, 175, 180, 185, 190. The bit periods each include magnetic information corresponding to data for a given bit period. As the density of the bit periods increase, magnetic information from one bit period will interfere or be combined with magnetic information from surrounding bit periods. This includes interaction from bit periods in one track with bit periods in prior and subsequent tracks. Failure to properly account for inter-track interference results in diminished accuracy of read back data.

Hence, for at least the aforementioned reasons, there exists a need in the art for advanced systems and methods for inter-track interference compensation.

SUMMARY

Embodiments are related to systems and methods for data processing, and more particularly to estimating or calculating interference between tracks on a storage medium.

Various embodiments of the present invention provide inter-track interference compensation systems. Such systems include a data buffer and an inter-track interference generation circuit. The data buffer is operable to store a previous track data set that includes both a new component and an old component. The inter-track interference generation circuit is operable to generate an inter-track interference from the previous track data set on a current track data set, wherein the inter-track interference includes a first interference component corresponding to the new component and a second interference component corresponding to the old component.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1A:
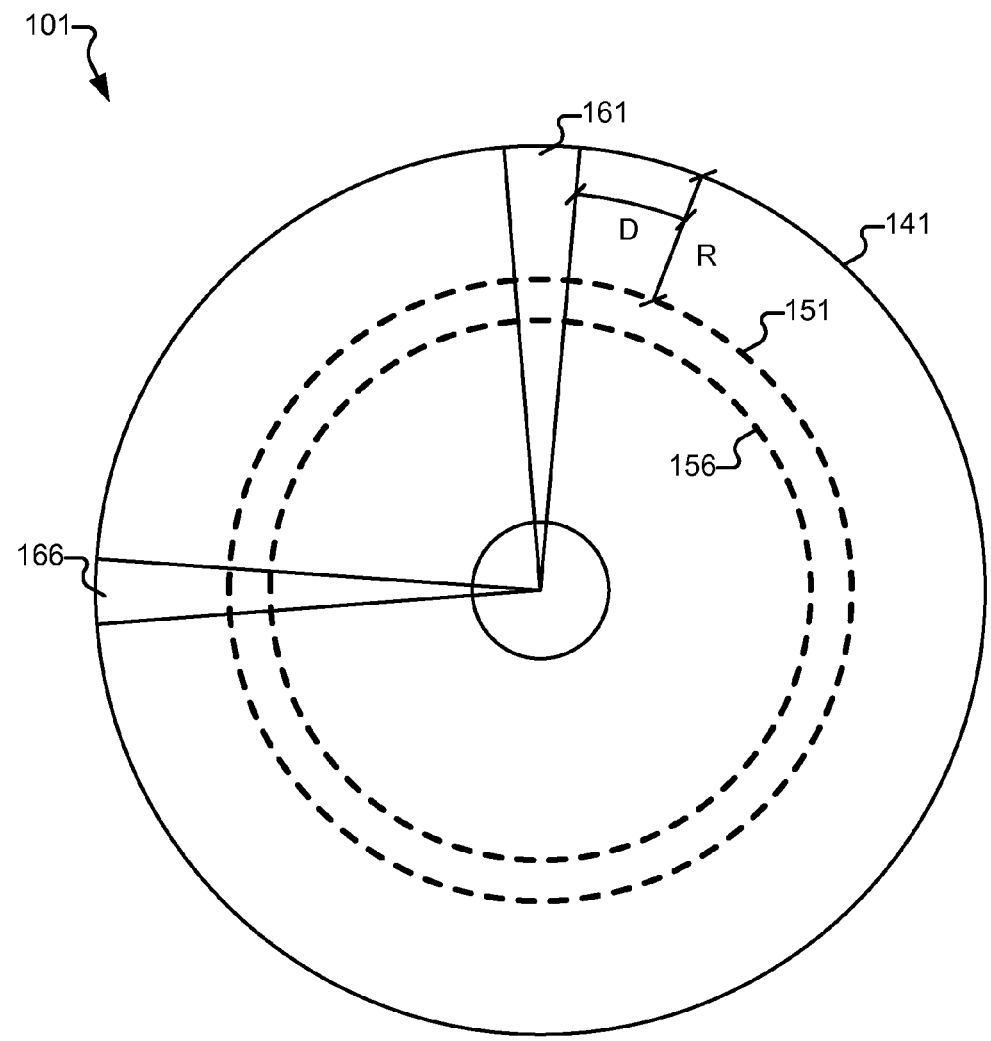
FIG. 1a depicts an existing storage medium including servo data.
Figure 1B:
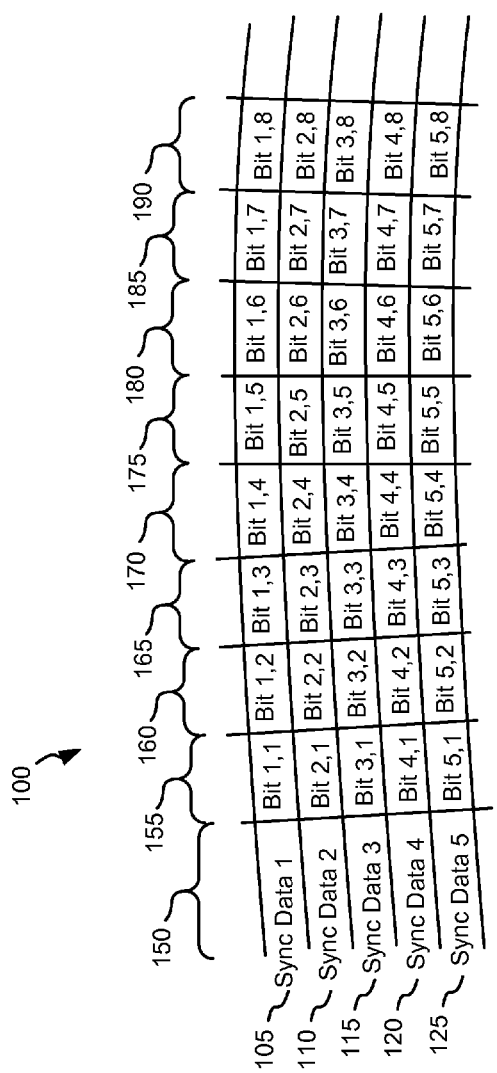
FIG. 1b depicts an existing track to track layout of data on a storage medium.

Embodiments are related to systems and methods for data processing, and more particularly to estimating or calculating interference between tracks on a storage medium.

In a storage system where bit period density has increased to the point that interference from one bit period location to another bit period location occurs, inter-track interference between bit periods in surrounding tracks may be estimated. In some cases, the inter-track interference between bit periods in surrounding tracks may include not only the most recently written data in an adjacent track, but also to data written to the surrounding tracks due to track centering ambiguity during the most recent write to the surrounding tracks. Various embodiments of the present invention provide circuits and methods for compensating inter-track interference from adjacent tracks including both recently written data and earlier written data.

Various embodiments of the present invention provide inter-track interference compensation systems. Such systems include a data buffer and an inter-track interference generation circuit. The data buffer is operable to store a previous track data set that includes both a new component and an old component. The inter-track interference generation circuit operable to generate an inter-track interference from the previous track data set on a current track data set, wherein the inter-track interference includes a first interference component corresponding to the new component and a second interference component corresponding to the old component. In some instances of the aforementioned embodiments, the systems further include a cancellation circuit operable to subtract the inter-track interference from the current track data set to yield a corrected output. In some such instances, the systems further include a latency circuit operable to align the current track data set with the corresponding inter-track interference.

In various instances of the aforementioned embodiments, the systems further include a storage medium having at least a previous track and a current track. In such instances, the new component and the old component are derived from the previous track, and the new component is more recently stored to the previous track than the old component. In some such instances, the old component is stored on the storage medium between the new component of the previous track data set and the current track data set. In some instances of the aforementioned embodiments, the inter-track interference generation circuit includes: a correlation based response estimation circuit, and a signal estimator circuit. The correlation based response estimation circuit is operable to calculate previous track filter coefficients based at least in part on the previous track data set on a current track data set, and the signal estimator circuit is operable to generate the inter-track interference based at least in part on the previous track filter coefficients and the previous track data set.

Figure 2:
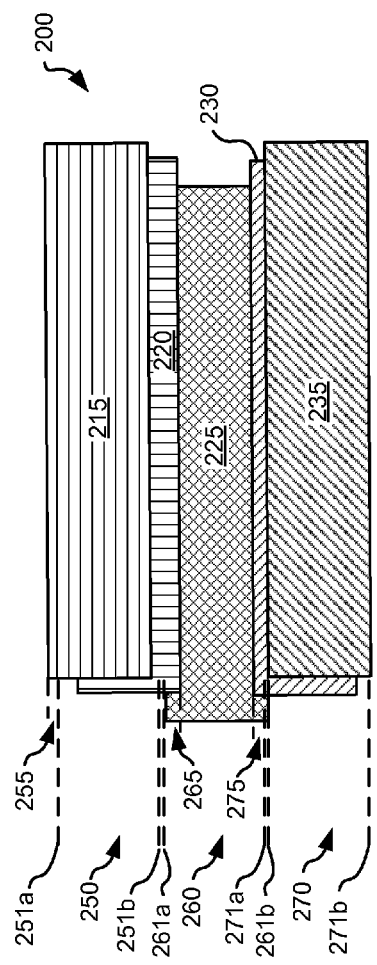
FIG. 2 shows a close-up representation of a portion of three consecutive tracks on a storage medium that include both newly written data and old data that may be processed in accordance with various embodiments of the present invention.

Turning to FIG. 2, a close-up representation 200 of a portion of three consecutive tracks 250, 260, 270 on a storage medium that include both data 215, 225, 235 and old data 220, 230 that may be processed in accordance with various embodiments of the present invention. It should be noted that FIG. 2 shows only some examples of old data, but that different embodiments of the present invention may be capable of any data remaining after a weak write. Thus, old data may include, but is not limited to, some grains from a previous write that are not flipped by a new write and thus is picked up by a read head. A center track 260 is expected to be written between outer limits 261a, 261b indicated as dashed lines; an adjacent track 250 is expected to be written between outer limits 251a, 251b indicated as dashed lines; and an adjacent track 270 that is expected to be written between outer limits 271a, 271b. As shown, data 215 is written beyond outer limit 251a by a distance 255, and old data 220 was written previous to data 215 and after newly written data 225, and beyond outer limit 251b by a distance 265. Data 235 was written within outer limits 271a, 271b. Data 230 was written previous to data 235 and after data 225, and beyond outer limit 271a by a distance 275.

When reading newly written data 225, a read head (not shown) is oriented in relation to outer limits 261a, 261b above the storage medium to sense data previously written to the storage medium. Where the consecutive tracks 250, 260, 270 are very close together, the data sensed by the read head will include not only newly written data 225, but also interference from old data 220, data 230, data 215 and data 235. Various embodiments of the present invention provide systems and methods for reducing the effects of inter-track interference from data 220, data 230, data 215 and data 235 on data 225.

Figure 3:
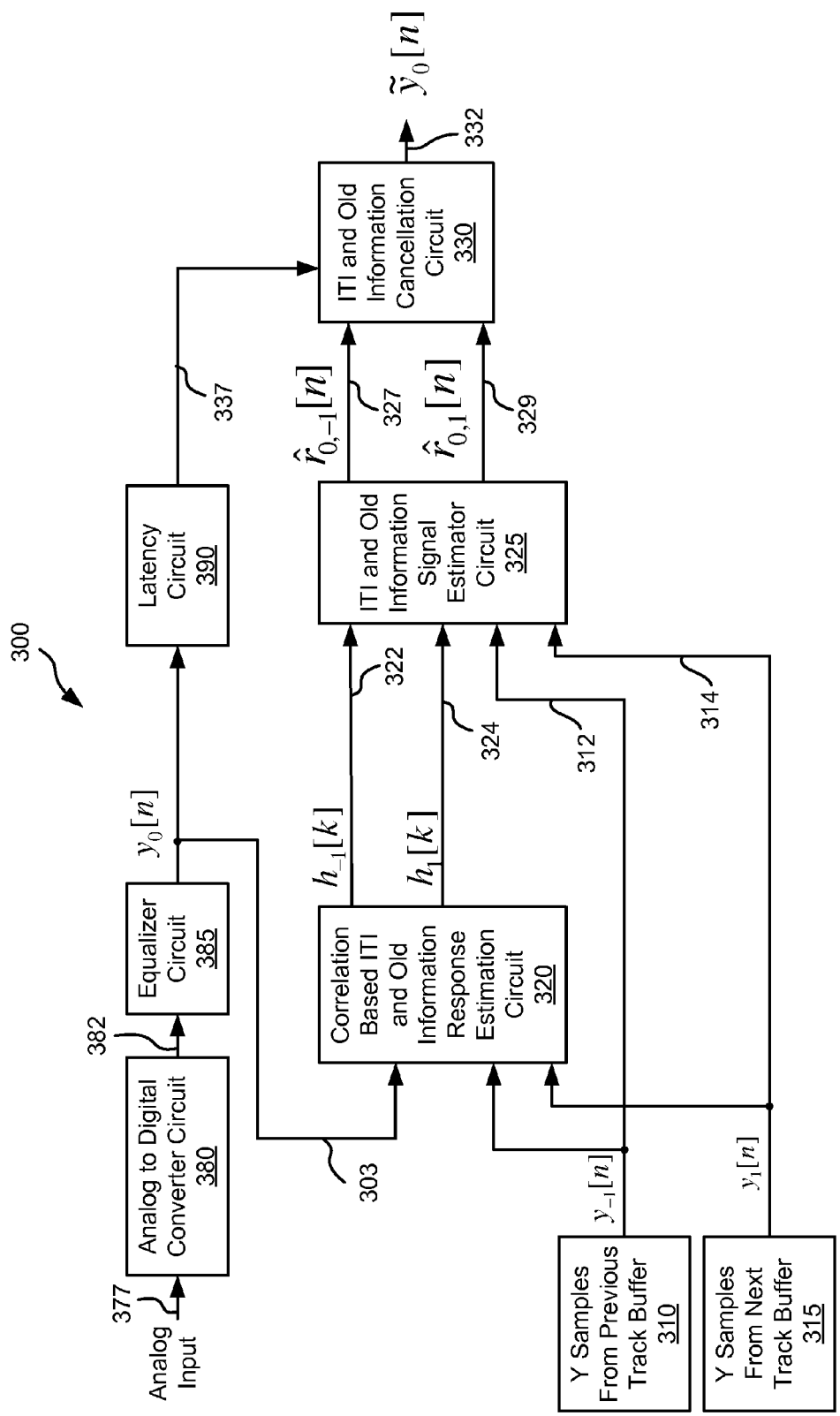
FIG. 3 depicts old data inter-track interference compensation circuit in accordance with one or more embodiments of the present invention.

Turning to FIG. 3, an old data inter-track interference compensation circuit 300 is shown in accordance with one or more embodiments of the present invention. Old data inter-track interference compensation circuit 300 receives an analog input signal 377. Analog input signal 377 may be derived, for example, from a read/write head assembly (not shown) disposed in relation to a given track on a storage medium (not shown), and represents information sensed from the track on the storage medium. Analog input signal 377 includes not only information from the given track, but also from both newly written data from adjacent tracks and old data from the adjacent tracks. Analog input signal 377 is provided to an analog to digital converter circuit 380 that operates to convert the analog signal into a series of digital samples 382 corresponding to analog input signal 377. Analog to digital converter circuit 380 may be any circuit known in the art that is capable of converting an analog signal into corresponding series of digital samples. Based upon the disclosure provided herein, one of ordinary skill in the art will recognize a variety of analog to digital converter circuits and/or architectures that may be used in relation to different embodiments of the present invention. Digital samples 382 are provided to an equalizer circuit 385 that equalizes the digital samples and provides an equalized output 303 ($y_0[n]$) to a correlation based inter-track interference and old information response estimation circuit 320. Equalized output 303 ($y_0[n]$) may be represented by the following equation including the different constituent pieces:

$$y_0[n]=r_{0,0}[n]+q_{0,1}[n]+q_{0,-1}[n]+p_{0,1}[n]+p_{0,-1}[n],$$

where $r_{0,0}[n]$ is the data that is expected when reading the center track (e.g., track 260 of FIG. 2), $q_{0,1}[n]$ is the interference on the center track from the newly written data on the next track (i.e., data 235 from track 270 of FIG. 2), $q_{0,-1}[n]$ is the interference on the center track from the newly written data on the previous track (i.e., data 215 from track 250 of FIG. 2), $p_{0,1}[n]$ is the interference on the center track from the old data residing between center track 260 and next track 270 (i.e., data 230 in FIG. 2), and $p_{0,-1}[n]$ is the interference on the center track from the old data residing between center track 260 and previous track 250 (i.e., data 220 in FIG. 2). In some embodiments of the present invention, equalizer circuit 385 may be implemented as a digital finite impulse response circuit as are known in the art. Based upon the disclosure provided herein, one of ordinary skill in the art will recognize a variety of equalizer circuits and/or architectures that may be used in relation to different embodiments of the present invention.

In addition, Y-samples ($y_{-1}[n]$) 312 are provided from a previous track buffer 310 to correlation based inter-track interference and old information response estimation circuit 320; and Y-samples ($y_1[n]$) 314 are provided from a next track buffer 315 to correlation based inter-track interference and old information response estimation circuit 320. Where, for example, equalized output 303 ($y_0[n]$) is derived from data read from center track 260 of FIG. 2, Y-samples from a next track buffer ($y_1[n]$) 314 may be obtained by reading adjacent track 270 and Y-samples from previous track buffer ($y_{-1}[n]$) 312 may be obtained by reading adjacent track 250.

Y-samples ($y_{-1}[n]$) 312 may be represented by the following equation including the different constituent pieces:

$$y_{-1}[n]=r_{-1,-1}[n]+q_{-1,0}[n]++q_{-1,-2}[n]+p_{-1,0}[n]+p_{-1,-2}[n],$$

where $r_{-1,-1}[n]$ is the data that is expected when reading the previous track (e.g., track 250 of FIG. 2), $q_{-1,0}[n]$ is the interference on the previous track (e.g., track 250 of FIG. 2) from the newly written data on the center track (e.g., data 225 from the center track 260 of FIG. 2), $q_{-1,-2}[n]$ is the interference on the previous track (e.g., track 250 of FIG. 2) from the newly written data on the track previous to the previous track (e.g., newly written data (not shown) from the track above track 250 of FIG. 2), $p_{-1,0}[n]$ is the interference on the previous track (e.g., track 250 of FIG. 2) from the old data residing between previous track 250 and center track 260 (e.g., data 220 in FIG. 2), $p_{-1,-2}[n]$ is the interference on the previous track (e.g., track 250 of FIG. 2) from the old data residing between the previous track 250 and the track previous to the previous track 250 (e.g., old data (not shown) from the region just above track 250 of FIG. 2). Y-samples ($y_1[n]$) 314 may be represented by the following equation including the different constituent pieces:

$$y_1[n]=r_{1,1}[n]+q_{1,0}[n]+q_{1,2}[n]+p_{0,1}[n]+p_{1,2}[n],$$

where $r_{1,1}[n]$ is the data that is expected when reading the next track (e.g., track 270 of FIG. 2), $q_{1,0}[n]$ is the interference on the next track (e.g., track 270 of FIG. 2) from the newly written data on the center track (e.g., data 225 from the center track 260 of FIG. 2), $q_{1,2}[n]$ is the interference on the next track (e.g., track 270 of FIG. 2) from the newly written data on the track next to the next track (e.g., newly written data (not shown) from the track below track 270 of FIG. 2), $p_{1,0}[n]$ is the interference on the next track (e.g., track 270 of FIG. 2) from the old data residing between next track 270 and center track 260 (e.g., data 230 in FIG. 2), $p_{1,2}[n]$ is the interference on the next track (e.g., track 270 of FIG. 2) from the old data residing between next track 270 and the track next to the next track 270 (e.g., other old data (not shown) from the region just below track 270 of FIG. 2). Of note, $r_{1,1}[n]$ and $q_{0,1}[n]$ are generated from the interaction of the same data bits 235 on next track 270, and $r_{-1,-1}[n]$ and $q_{0,-1}[n]$ are generated from the interaction of the same data bits 215 on previous track 250. Further, $p_{1,0}[n]$ and $p_{0,1}[n]$ are generated by the same data 230; $p_{-1,0}[n]$ and $p_{0,-1}[n]$ are generated by the same data 220; $r_{0,0}$, $q_{1,0}[n]$ and $q_{-1,0}[n]$ are generated by the same data 225 on center track 260.

Because $r_{0,0}[n]$ and $q_{1,0}[n]$ are generated by the same newly written data, it is not possible to estimate the ITI component $q_{0,1}[n]$ by directly correlating $y_0[n]$ with $y_1[n]$. In such a direct correlation, $q_{1,0}[n]$ from $y_1[n]$ would interfere with the desired $r_{0,0}[n]$. Similarly, because $r_{0,0}[n]$ and $q_{-1,0}[n]$ are generated by the same newly written data, it is not possible to estimate the ITI component $q_{0,-1}[n]$ by directly correlating $y_0[n]$ with $y_{-1}[n]$. In such a direct correlation, $q_{-1,0}[n]$ from $y_{-1}[n]$ would interfere with the desired $r_{0,0}[n]$. Therefore, an error signal $e_0[n]$ is calculated for the center track by removing an estimate of $r_{0,0}[n]$ from $y_0[n]$ in accordance with the following equation:

$$e_0[n]=y_0[n]-\hat{r}_{0,0}[n]$$

where $$\hat{r}_{0,0}[n] = \sum_{i=0}^{N_g} g_i \hat{a}_0[n-i].$$

Here, $g_0, g_1, \ldots, g_{N_g}$ denote the channel response up until equalizer output and $\hat{a}_0[n]$ denotes the preliminary data decisions for center track. This corrected value is then correlated with y-samples ($y_1[n]$) 314 by correlation based inter-track interference and old information response estimation circuit 320 in accordance with the following equation:

$$\{E[e_0[n]\cdot y_1[n-k]]\}.$$

The aforementioned term $\{E[e_0[n]\cdot y_1[n-k]]\}$ is the correlation between the corrected version of the center track (represented as $e_0[n]$) and the next track (represented as $y_1[n]$). This corrected value is also correlated with y-samples ($y_{-1}[n]$) 312 by correlation based inter-track interference and old information response estimation circuit 320 in accordance with the following equation:

$$\{E[e_0[n]\cdot y_{-1}[n-k]]\}.$$

The aforementioned term $\{E[e_0[n]\cdot y_{-1}[n-k]]\}$ is the correlation between the corrected version of the center track (represented as $e_0[n]$) and the previous track (represented as $y_{-1}[n]$).

The aforementioned correlation values are then used by correlation based inter-track interference and old information response estimation circuit 320 to calculate previous track filter coefficients ($h_{-1}[k]$) 322 and next track filter coefficients ($h_1[k]$) 324. In particular, previous track filter coefficients ($h_{-1}[k]$) 322 and next track filter coefficients ($h_1[k]$) 324 are calculated in accordance with the following equations:

$$\{h_{-1}[k]\}=\text{inv}(\tilde{R}_{-1})\cdot\{E[e_0[n]\cdot y_{-1}[n-k]]\}; \text{ and}$$

$$\{h_1[k]\}=\text{inv}(\tilde{R}_{-1})\cdot\{E[e_0[n]\cdot y_1[n-k]]\}.$$

In the aforementioned equations, $h_{-1}[k]$ represents a compound of the inter-track interference from both the data 215 on previous track 250 and the data 220 residing between center track 260 and previous track 250, and $h_1[k]$ represents a compound of the inter-track interference from both the data 235 on next track 270 and the data 230 residing between center track 260 and next track 270. $\tilde{R}_{-1}$ is an auto correlation matrix of Y-samples from the previous track (i.e., y-samples ($y_{-1}[n]$) 312), and $\tilde{R}_1$ is an auto-correlation matrix of Y-samples from the next track (i.e., y-samples ($y_1[n]$) 314).

Previous track filter coefficients ($h_{-1}[k]$) 322 and next track filter coefficients ($h_1[k]$) 324 are provided to an inter-track interference and old information signal estimator circuit 325. Inter-track interference and old information signal estimator circuit 325 calculates previous track interference ($\hat{r}_{0,-1}[n]$) 327 which includes inter-track interference both from data 215 and data 220, and next track interference ($\hat{r}_{0,-1}[n]$) 329 which includes inter-track interference both from data 235 and data 230 in accordance with the following equations:

$$\hat{r}_{0,-1}[n] = \sum_{k=-M_2}^{M_2} h_{-1}[k]y_{-1}[n-k]; \text{ and}$$

$$\hat{r}_{0,1}[n] = \sum_{k=-M_2}^{M_2} h_1[k]y_1[n-k].$$

In the aforementioned equations, $M_2$ represents the region over which the interference is calculated.

A latency circuit 390 delays equalized output 303 by a delay amount to yield a delayed output 337. The amount of delay corresponds to the delay through correlation based inter-track interference and old information response estimation circuit 320 and inter-track interference and old information signal estimator circuit 325 such that delayed output 337 is aligned with previous track interference 327 and next track interference 329. Delayed output 337, previous track interference 327, and next track interference 329 are provided to an inter-track interference and old information cancellation circuit 330. Inter-track interference and old information cancellation circuit 330 subtracts both previous track interference 327 and next track interference 329 from delayed output 337 in accordance with the following equation to yield a corrected output $\tilde{y}_0[n]$ 332:

$$y_0[n]=\text{Delayed Output 337}-[\hat{r}_{0,-1}[n]+\hat{r}_{0,1}[n]].$$

The matrix inversion utilized by the aforementioned approach is relatively complex. To alleviate this complexity, the matrix inversion may be replaced by a fast recursive least squares algorithm as is known in the art. Based upon the disclosure provided herein, one of ordinary skill in the art will recognize other modifications to the approach set forth above to reduce complexity while maintaining reasonable accuracy.

Figure 4A:
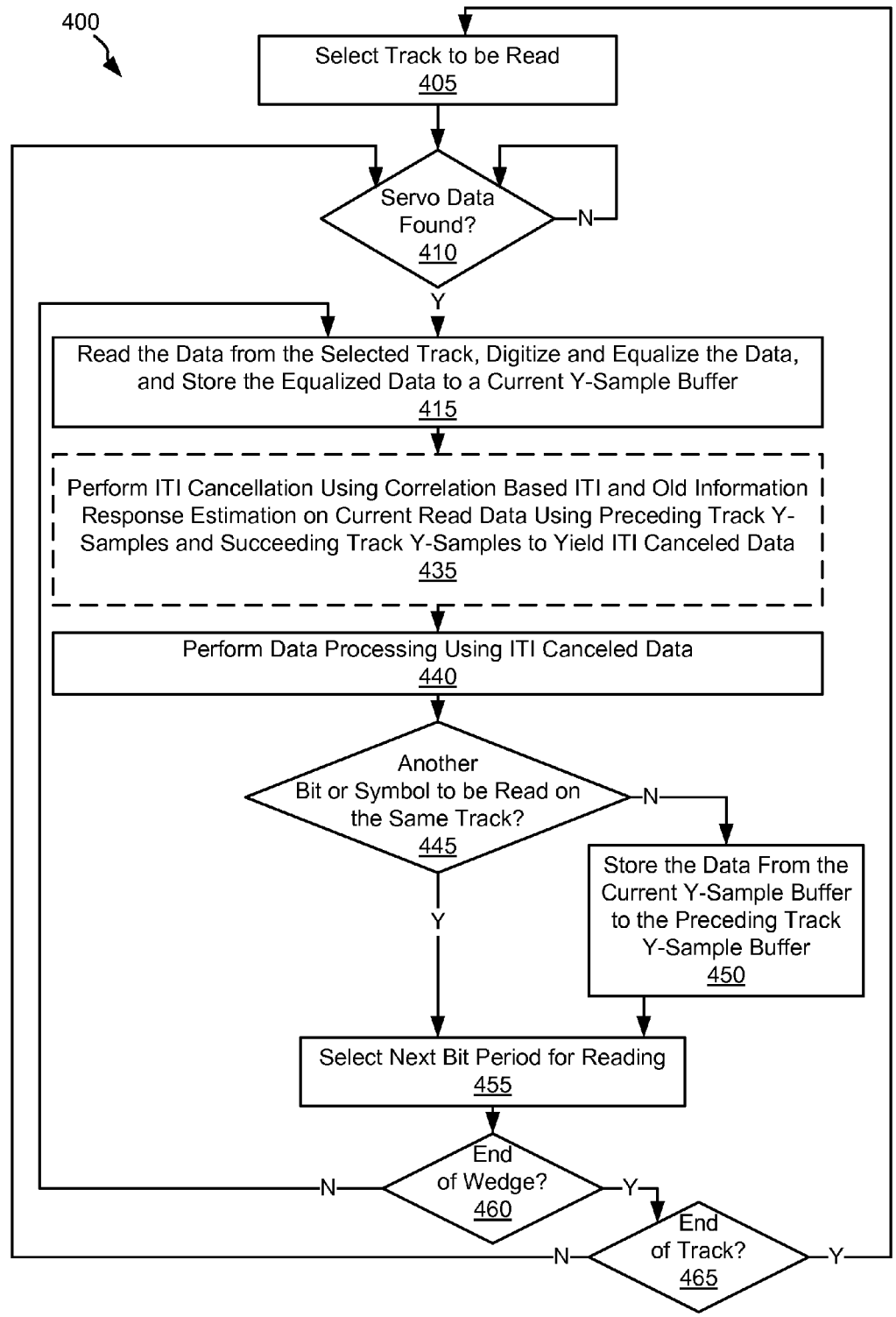
FIGS. 4a-4b are flow diagrams showing a method for inter-track interference compensation using an old data inter-track interference compensation circuit in accordance with one or more embodiments of the present invention.

Turning to FIG. 4a, a flow diagram 400 shows a method for inter-track interference compensation using an old data inter-track interference compensation circuit in accordance with one or more embodiments of the present invention. Following flow diagram 400, a track to be read is selected (block 405). It is determined whether servo data on the selected track is found (block 410). Where the servo data is not found (block 410), the process continues to look for the servo data. Alternatively, where the servo data is found (block 410), data from the selected track is read, digitized and equalized, and the equalized data is stored to a current y-sample buffer (block 415).

Figure 4B:
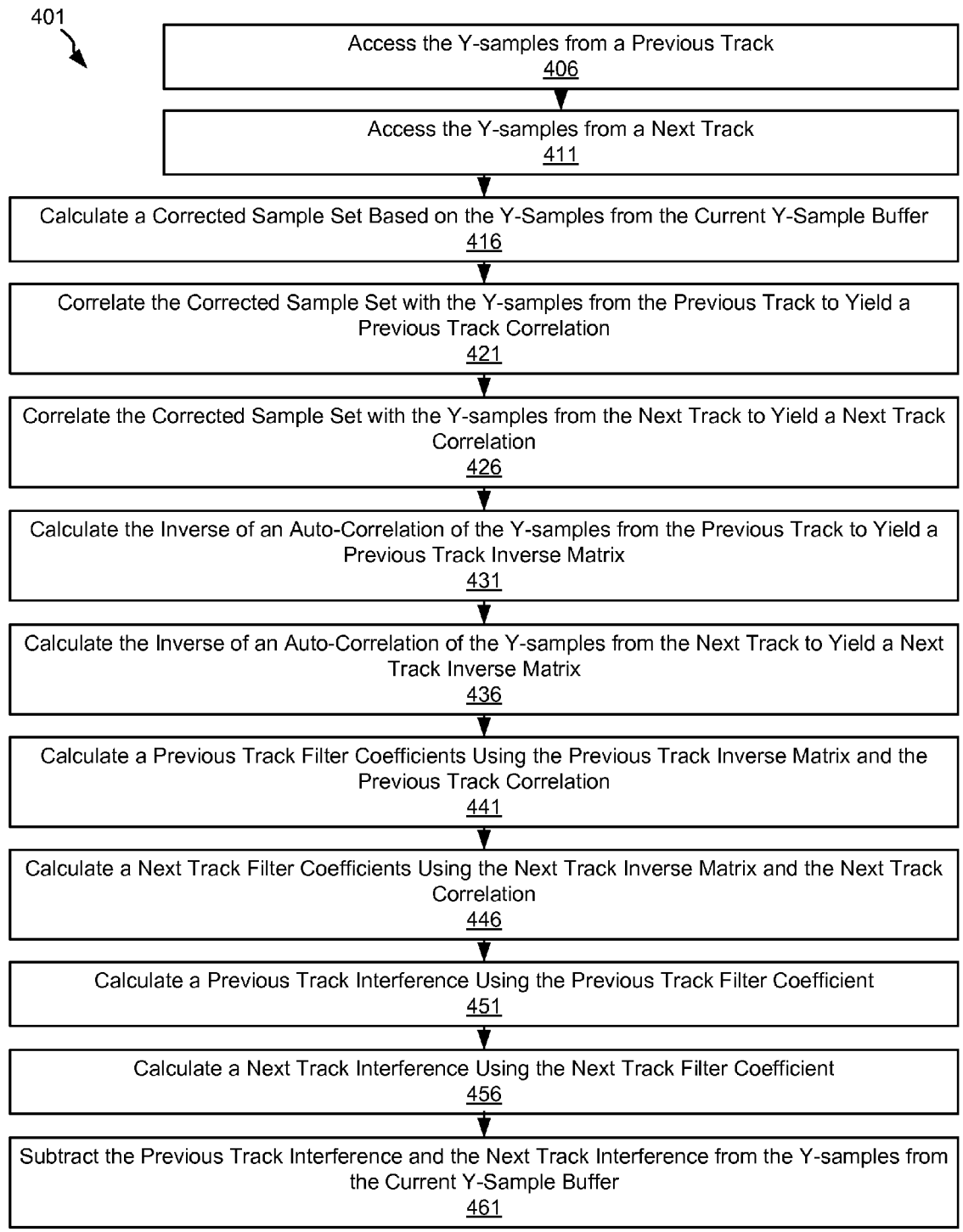

Inter-track interference is cancelled using correlation based inter-track interference and old information response estimation on a current track using y-samples from a preceding track and y-samples from a next track to yield inter-track interference canceled data (block 435). Block 435 is shown in dashed lines as one implementation of the block is shown in detail in FIG. 4b. Following a flow diagram 401 of FIG. 4b, y-samples from a previous track (block 406) and y-samples from a next track (block 411) are accessed. The Y-samples from the previous track ($y_{-1}[n]$) may be represented by the following equation including the different constituent pieces:

$$y_{-1}[n]=r_{-1,-1}[n]+q_{-1,0}[n]+q_{-1,-2}[n]+p_{-1,0}[n]+p_{-1,-2}[n],$$

where $r_{-1,-1}[n]$ is the data that is expected when reading the previous track (e.g., track 250 of FIG. 2), $q_{-1,0}[n]$ is the interference on the previous track (e.g., track 250 of FIG. 2) from the newly written data on the center track (e.g., data 225 from track 260 of FIG. 2), $q_{-1,-2}[n]$ is the interference on the previous track (e.g., track 250 of FIG. 2) from the newly written data on the track previous to the previous track (e.g., newly written data (not shown) from the track below track 270 of FIG. 2), $p_{-1,0}[n]$ is the interference on the previous track (e.g., track 250 of FIG. 2) from the old data residing between previous track 250 and center track 260 (e.g., data 220 in FIG. 2), $p_{-1,-2}[n]$ is the interference on the previous track (e.g., track 250 of FIG. 2) from the old data residing between the previous track 250 and the track previous to the previous track 250 (e.g., old data (not shown) from the region just above track 250 of FIG. 2). The y-samples from the next track ($y_1[n]$) may be represented by the following equation including the different constituent pieces:

$$y_1[n]=r_{1,1}[n]+q_{1,0}[n]+q_{1,2}[n]+p_{1,0}[n]+p_{1,2}[n],$$

where $r_{1,1}[n]$ is the data that is expected when reading the next track (e.g., track 270 of FIG. 2), $q_{1,0}[n]$ is the interference on the next track (e.g., track 270 of FIG. 2) from the newly written data on the center track (e.g., data 225 from the center track 260 of FIG. 2), $q_{1,2}[n]$ is the interference on the next track (e.g., track 270 of FIG. 2) from the newly written data on the track next to the next track (e.g., newly written data (not shown) from the track below track 270 of FIG. 2), $p_{1,0}[n]$ is the interference on the next track (e.g., track 270 of FIG. 2) from the old data residing between the next track and center track (e.g., data 230 of FIG. 2), $p_{1,2}[n]$ is the interference on the next track (e.g., track 270 of FIG. 2) from the old data residing between the next track and the track after the next track (e.g., old data (not shown) from the region just below track 270 of FIG. 2). Of note, $r_{1,1}[n]$ and $q_{0,1}[n]$ are generated from the interaction of the same data bits 235, and $r_{-1,-1}[n]$ and $q_{0,-1}[n]$ are generated from the interaction of the same data bits 215. Further, $p_{1,0}[n]$ and $p_{0,1}[n]$ are generated by the same old data 230; $p_{-1,0}[n]$ and $p_{0,-1}[n]$ are generated by the same old data 220; $r_{0,0}[n]$, $q_{1,0}[n]$ and $q_{-1,0}[n]$ are generated by the same newly written data 225.

A corrected sample set is calculated based on the y-samples from the current (center track) y-sample buffer (block 416). In particular, because $r_{0,0}[n]$ and $q_{1,0}[n]$ are generated by the same newly written data 225, it is not possible to estimate the inter-track interference component $q_{0,1}[n]$ by directly correlating $y_0[n]$ with $y_1[n]$. In such a direct correlation, $q_{1,0}[n]$ from $y_1[n]$ would interfere with the desired $r_{0,0}[n]$. Similarly, because $r_{0,0}[n]$ and $q_{-1,0}[n]$ are generated by the same newly written data 225, it is not possible to estimate the ITI component $q_{0,-1}[n]$ by directly correlating $y_0[n]$ with $y_{-1}[n]$. In such a direct correlation, $q_{-1,0}[n]$ from $y_{-1}[n]$ would interfere with the desired $r_{0,0}[n]$. Therefore, a corrected sample set $e_0[n]$ may be calculated in accordance with the following equation:

$$e_0[n]=y_0[n]-\hat{r}_{0,0}[n],$$

where $$\hat{r}_{0,0}[n] = \sum_{i=0}^{N_g} g_i \hat{a}_0[n-i].$$

Here, $g_0, g_1, \ldots, g_{N_g}$ denote the channel response up until equalizer output and $\hat{a}_0[n]$ denotes the preliminary data decisions for center track. The corrected sample set is correlated with the y-samples from the previous track to yield a previous track correlation (block 421), and the corrected sample set is correlated with the y-samples from the next track to yield a next track correlation (block 426). These correlations are represented by the following equations:

$$\{E[e_0[n] \cdot y_1[n-k]]\}; \text{ and}$$

$$\{E[e_0[n] \cdot y_{-1}[n-k]]\}.$$

An inverse of the auto-correlation of the y-samples from the previous track is calculated to yield a previous track inverse matrix represented as $\text{inv}(\hat{R}_{-1})$ (block 431), and an inverse of the auto-correlation of the y-samples from the next track is calculated to yield a next track inverse matrix represented as $\text{inv}(\hat{R}_1)$ (block 436). As the complexity of calculating an inverse matrix can be relatively large, the inverse matrix function may be replaced in some embodiments of the present invention by a fast recursive least squares algorithm as is known in the art. Previous track filter coefficients ($h_{-1}[k]$) are calculated using the previous track inverse matrix and the previous track correlation (block 441), and next track filter coefficients ($h_1[k]$) are calculated using the next track inverse matrix and the next track correlation (block 446) in accordance with the following equations:

$$\{h_{-1}[k]\}=\text{inv}(\hat{R}_{-1}) \cdot \{E[e_0[n] \cdot y_{-1}[n-k]]\}; \text{ and}$$

$$\{h_1[k]\}=\text{inv}(\hat{R}_1) \cdot \{E[e_0[n] \cdot y_1[n-k]]\}.$$

Using the previous track filter coefficients, a previous track interference ($\hat{r}_{0,-1}[n]$) is calculated (block 451) in accordance with the following equation:

$$\hat{r}_{0,-1}[n] = \sum_{k=-M_2}^{M_2} h_{-1}[k] y_{-1}[n-k].$$

Using the next track filter coefficients, a next track interference ($\hat{r}_{0,1}[n]$) is calculated (block 456) in accordance with the following equation:

$$\hat{r}_{0,1}[n] = \sum_{k=-M_2}^{M_2} h_1[k] y_1[n-k].$$

In the aforementioned equations, $M_2$ represents the region over which the interference is calculated. The previous track interference and the next track interference are subtracted from the corresponding center track y-samples from the current y-sample buffer (block 461) in accordance with the following equation to yield the inter-track interference canceled data ($\tilde{y}_0[n]$):

$\tilde{y}_0[n]$=Center Track Current $y_0[n] - [\hat{r}_{0,-1}[n] + \hat{r}_{0,1}[n]]$.

Returning to FIG. 4a, data processing is applied to the inter-track interference canceled data (block 440). This data processing may be any data processing known in the art. Such data processing may include, but is not limited to, applying a data detection algorithm to the inter-track interference canceled data to yield a detected output, and applying a data decoding algorithm to a decoder input derived from the detected output to yield a decoded output. In some embodiments of the present invention, the data processing is iterative including multiple applications of both the data detection algorithm and the data decoding algorithm. In some embodiments of the present invention, the data detection algorithm is a maximum a posteriori data detection algorithm. In various embodiments of the present invention, the data decoding algorithm is a low density parity check algorithm.

It is determined whether another bit or symbol is to be read on the same track (block 445). Where another bit or symbol is to be read on the track (block 445), the next bit or symbol period is selected for reading (block 455) and it is determined whether the end of the wedge has been reached (block 460). Where the end of the wedge has not yet been reached (block 460), the processes beginning at block 415 are started for the selected bit or symbol period. Otherwise, where either another bit or symbol does not remain to be read on the same track (block 445) or the end of the wedge is reached (block 460), it is determined whether it is the end of the track (block 465). Where the end of the track is not yet reached (block 465), the processes beginning at block 410 are started for the selected bit or symbol period. Alternatively, where the end of the track is reached (block 465), the processes beginning at block 405 are repeated for the next selected track.

Figure 5:
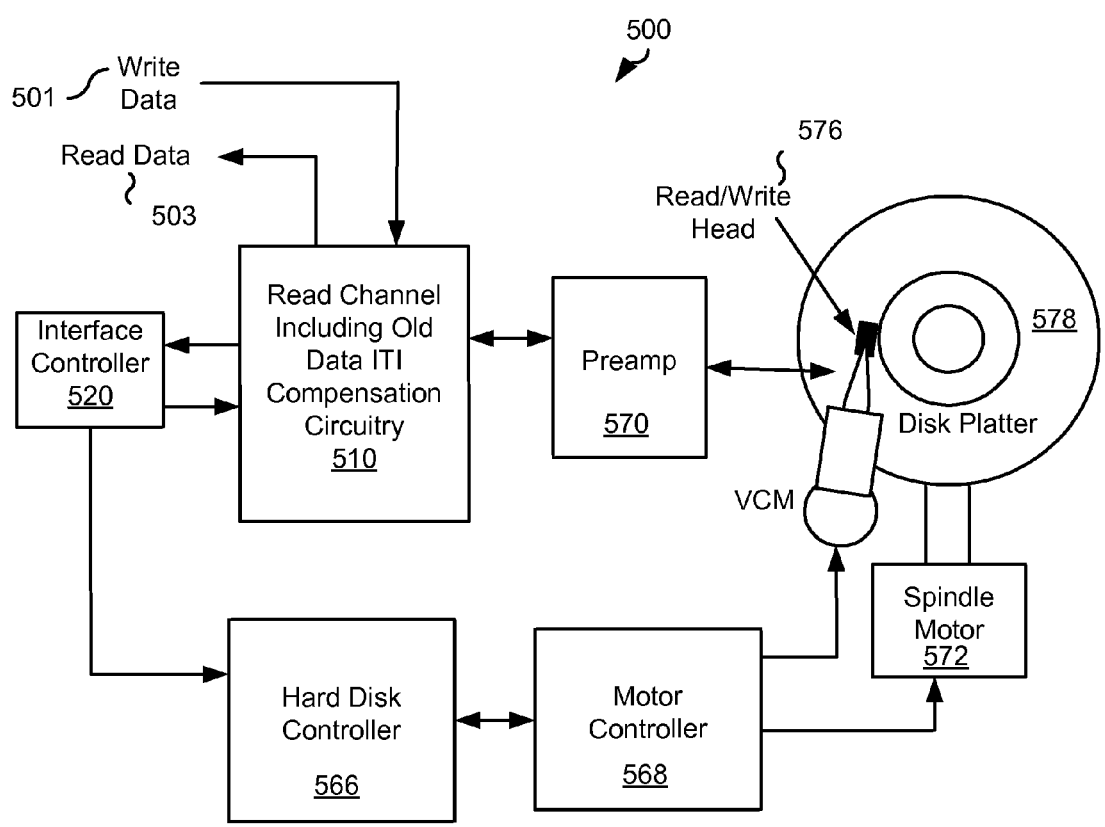
FIG. 5 shows a storage system with an old data inter-track interference compensation circuit in accordance with various embodiments of the present invention.

Turning to FIG. 5, a storage system 500 is shown including a read channel circuit 510 with an old data inter-track interference compensation circuit in accordance with various embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and a read/write head 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with either a longitudinal or a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel 510 via preamplifier 570. Preamplifier 570 is operable to amplify the minute analog signals accessed from disk platter 578. In turn, read channel circuit 510 decodes and digitizes the received analog signal to recreate the information originally written to disk platter 578. This data is provided as read data 503 to a receiving circuit. As part of processing the received information, read channel circuit 510 performs an inter-track interference compensation for both newly written data and old data. Such an inter-track interference compensation circuit may be implemented similar to that described above in relation to FIG. 3, and/or may operate similar to the method discussed in relation to FIGS. 4a-4b. A write operation is substantially the opposite of the preceding read operation with write data 501 being provided to read channel circuit 510. This data is then encoded and written to disk platter 578.

It should be noted that storage system 500 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 510 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 500 may be modified to include solid state memory that is used to store data in addition to the storage offered by disk platter 578. This solid state memory may be used in parallel to disk platter 578 to provide additional storage. In such a case, the solid state memory receives and provides information directly to read channel circuit 510. Alternatively, the solid state memory may be used as a cache where it offers faster access time than that offered by disk platted 578. In such a case, the solid state memory may be disposed between interface controller 520 and read channel circuit 510 where it operates as a pass through to disk platter 578 when requested data is not available in the solid state memory or when the solid state memory does not have sufficient storage to hold a newly written data set. Based upon the disclosure provided herein, one of ordinary skill in the art will recognize a variety of storage systems including both disk platter 578 and a solid state memory.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for processing data from a storage medium. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. An inter-track interference compensation system, the system comprising:
    a data buffer operable to store a previous track data set as a series of multi-bit digital samples, wherein the previous track data set includes: a new component and an old component, wherein the old component is stored on a storage medium between the new component of the previous track data set and a current track data set;
    an inter-track interference generation circuit operable to generate an inter-track interference from the previous track data set on the current track data set, wherein the inter-track interference includes a first interference component corresponding to the new component and a second interference component corresponding to the old component.

2. The system of claim 1, wherein the system further comprises:
    a cancellation circuit operable to subtract the inter-track interference from the current track data set to yield a corrected output.

3. The system of claim 2, wherein the system further comprises:
    a latency circuit operable to align the current track data set with the corresponding inter-track interference.

4. The system of claim 1, wherein the system further comprises:
    a storage medium including at least a previous track and a current track, wherein the new component and the old component are derived from the previous track, and wherein the new component is more recently stored to the previous track than the old component.

5. The system of claim 1, wherein the inter-track interference generation circuit comprises:
    a correlation based response estimation circuit operable to calculate previous track filter coefficients based at least in part on the previous track data set on a current track data set; and
    a signal estimator circuit operable to generate the inter-track interference based at least in part on the previous track filter coefficients and the previous track data set.

6. The system of claim 1, wherein the inter-track interference is a first inter-track interference, the data buffer is a first data buffer, the new component is a first new component, and the old component is a first old component, and wherein the system further comprises:
    a second data buffer operable to store a next track data set, wherein the next track data set includes: a second new component and a second old component; and
    wherein the inter-track interference generation circuit is further operable to calculate a second inter-track interference from the next track data set on the current track data set, wherein the second inter-track interference includes a third interference component corresponding to the second new component and a fourth interference component corresponding to the second old component.

7. The system of claim 6, wherein the system further comprises:
    a cancellation circuit operable to subtract the first inter-track interference and the second inter-track interference from the current track data set to yield a corrected output.

8. The system of claim 6, wherein the system further comprises:
    a storage medium including at least a previous track, a next track, and a current track, wherein the previous track is disposed on one side of the current track and the next track is disposed on the opposite side of the current track, wherein the first new component and the first old component are derived from the previous track, wherein the second new component and the second old component are derived from the next track, wherein the first new component is more recently stored to the previous track than the first old component, and wherein the second new component is more recently stored to the next track than the second old component.

9. The system of claim 8, wherein the first old component is stored on the storage medium between the first new component of the previous track data set and the current track data set, and wherein the second old component is stored on the storage medium between the second new component of the next track data set and the current track data set.

10. The system of claim 1, wherein the system is implemented as part of an integrated circuit.

11. The system of claim 1, wherein the system is implemented as part of a hard disk drive.

12. A method for inter-track interference compensation, the method comprising:
   receiving a current track data set and a previous track data set, wherein the previous track data set is represented as a series of multi-bit digital samples and includes: a new component and an old component, wherein the old component is accessed from a storage medium at a location between the new component of the previous track data set and the current track data set;
   generating an inter-track interference from the previous track data set on the current track data set using an inter-track interference generation circuit, wherein the inter-track interference includes a first interference component corresponding to the new component and a second interference component corresponding to the old component; and
   subtracting the inter-track interference from the current track data set to yield a corrected output.

13. The method of claim 12, wherein the method further comprises:
   aligning the current track data set with the corresponding inter-track interference.

14. The method of claim 12, wherein the method further comprises:
   accessing a previous track of a storage medium to obtain the previous track data set; and
   accessing a current track of the storage medium to obtain the current track data set, wherein the previous track is adjacent to the current data track.

15. The method of claim 14, wherein the method further comprises:
   storing the old component to the previous track of the storage medium; and
   storing the new component to the previous track of the storage medium after storing the old component.

16. The method of claim 15, wherein a residual of the old component is stored on the storage medium between the new component of the previous track data set and the current track data set.

17. The method of claim 12, wherein generating the inter-track interference comprises:
   calculating previous track filter coefficients based at least in part on the previous track data set on a current track data set; and
   generating the inter-track interference based at least in part on the previous track filter coefficients and the previous track data set.

18. The method of claim 12, wherein the inter-track interference is a first inter-track interference, the data buffer is a first data buffer, the new component is a first new component, and the old component is a first old component, and wherein the system further comprises:
   receiving a next track data set, wherein the next track data set includes: a second new component and a second old component; and
   generating a second inter-track interference from the next track data set on the current track data set using the inter-track interference generation circuit, wherein the second inter-track interference includes a third interference component corresponding to the second new component and a fourth interference component corresponding to the second old component; and
   subtracting the second inter-track interference from the current track data set along with the first inter-track interference to yield the corrected output.

19. A data storage device, the data storage device comprising:
   a storage medium including at least a previous track and a current data track;
   a head assembly disposed in relation to the storage medium;
   a read channel circuit operable to receive an information set from the storage medium via the head assembly, wherein the information set includes a previous track data set and a current track data set, wherein the previous track data set is represented as a series of multi-bit digital samples and maintained in a buffer, and wherein the previous track data set is derived from the previous track and the current track data set derived from the current track, the read channel circuit including:
      an inter-track interference generation circuit operable to generate an inter-track interference from the previous track data set on a current track data set, wherein the inter-track interference includes a first interference component corresponding to a new component and a second interference component corresponding to an old component, wherein the old component is stored on the storage medium between the new component of the previous track data set and a current track data set; and
      a cancellation circuit operable to subtract the inter-track interference from the current track data set to yield a corrected output.

* * * * *